(12) United States Patent
Costa Majo

(10) Patent No.: US 11,055,035 B2
(45) Date of Patent: Jul. 6, 2021

(54) DEVICE-INDEPENDENT CANVAS

(71) Applicant: HEWLETT-PACKARD DEVELOPMENT COMPANY, L.P., Spring, TX (US)

(72) Inventor: Francisco Costa Majo, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/612,808

(22) PCT Filed: Aug. 21, 2017

(86) PCT No.: PCT/US2017/047725
§ 371 (c)(1),
(2) Date: Nov. 12, 2019

(87) PCT Pub. No.: WO2019/040038
PCT Pub. Date: Feb. 28, 2019

(65) Prior Publication Data
US 2020/0150907 A1 May 14, 2020

(51) Int. Cl.
*G06F 3/12* (2006.01)
*G06F 9/451* (2018.01)

(52) U.S. Cl.
CPC .......... *G06F 3/1208* (2013.01); *G06F 3/1232* (2013.01); *G06F 3/1256* (2013.01); *G06F 3/1292* (2013.01); *G06F 9/451* (2018.02)

(58) Field of Classification Search
CPC .... G06F 3/1208; G06F 3/1232; G06F 3/1256; G06F 3/1292; G06F 9/451
USPC .......................................................... 358/1.1
See application file for complete search history.

(56) References Cited

U.S. PATENT DOCUMENTS

| | | | |
|---|---|---|---|
| 8,341,214 B2 | 12/2012 | Liu et al. | |
| 8,630,000 B2* | 1/2014 | Chang | G06F 3/1228 358/1.15 |
| 8,711,416 B1 | 4/2014 | Byer | |
| 9,436,416 B2 | 9/2016 | Yu et al. | |
| 2003/0076521 A1* | 4/2003 | Li | G06F 3/1205 358/1.13 |
| 2003/0078965 A1 | 4/2003 | Cocotis et al. | |

(Continued)

OTHER PUBLICATIONS

IOS Printing App for iPhone and iPad < http://www.printeron.com/apps/ios-printing-app.html >.
(Continued)

*Primary Examiner* — Allen H Nguyen
(74) *Attorney, Agent, or Firm* — HP Inc. Patent Department (57) ABSTRACT

An example system is described including a discovery engine to generate a list of printers and print services available on a network and a composition engine to generate a device-independent canvas that includes a preview image of the print job derived from a raster image processing service of the list of printers and print services. The preview image is oriented on the canvas using a layout relationship that adjusts a layout format based on printer setting information corresponding to the print apparatus and print service combination. The layout format corresponds to an amount of media space available when printing with the print apparatus.

13 Claims, 5 Drawing Sheets

(56) References Cited

U.S. PATENT DOCUMENTS

| | | | |
|---|---|---|---|
| 2008/0079977 A1* | 4/2008 | van de Capelle | G06F 3/1205 |
| | | | 358/1.13 |
| 2011/0075166 A1 | 3/2011 | Goldwater | |
| 2011/0292413 A1* | 12/2011 | Crean | H04N 1/00023 |
| | | | 358/1.9 |
| 2012/0268777 A1 | 10/2012 | Fry | |
| 2013/0286425 A1* | 10/2013 | Nakamura | G06F 3/122 |
| | | | 358/1.13 |
| 2014/0376019 A1 | 12/2014 | Ozawa | |
| 2015/0242168 A1* | 8/2015 | Yu | G06F 3/1208 |
| | | | 358/1.13 |
| 2015/0242371 A1 | 8/2015 | Yu | |
| 2016/0098238 A1 | 4/2016 | Grandil | |
| 2016/0255242 A1 | 9/2016 | Osadchyy et al. | |

OTHER PUBLICATIONS

Wireless Printing with Epson Connect TM < https://epson.com/epson-connect-wireless-printing >.

* cited by examiner

602 IDENTIFY SERVICES OFFERED BY A PRINT APPARATUS ON A NETWORK ACCESSIBLE BY A MOBILE DEVICE

604 DETERMINE WHETHER A SERVICE INCLUDES RASTER IMAGE PROCESSING TO BE PERFORMED ON A PRINT SERVER

606 PROCESS IMAGE DATA OF A PRINT JOB TO GENERATE A PREVIEW ACCORDING TO A SIZE ATTRIBUTE OF THE MOBILE DEVICE IN RESPONSE TO SELECTION OF THE SERVICE

608 GENERATE A DEVICE-INDEPENDENT CANVAS WITH THE PREVIEW BASED ON A LAYOUT RELATIONSHIP THAT, WHEN RENDERED, ADJUSTS ACCORDING TO DEVICE AND PRINTER ATTRIBUTES

*FIG. 6*

702 IDENTIFY SERVICES OFFERED BY A PRINT APPARATUS ON A NETWORK AND A SUPPORTED PAGE DESCRIPTION LANGUAGE

704 DETERMINE WHETHER A SERVICE INCLUDES RASTER IMAGE PROCESSING TO BE PERFORMED ON A PRINT SERVER

705 REDIRECT A REQUEST TO A PRINT SERVER

706 PROVIDE A UNIVERSAL RESOURCE LOCATOR TO A PRINT SERVER WHERE THE MOBILE DEVICE CAN SEND THE PRINT JOB DATA TO BE PROCESSED TO GENERATE A DEVICE-INDEPENDENT CANVAS

708 RIPPING THE PRINT JOB DATA USING A RASTER IMAGE PROCESSING ENGINE COMPATIBLE WITH THE PAGE DESCRIPTION LANGUAGE AND GENERATE A PREVIEW ACCORDING TO A SIZE ATTRIBUTE OF THE MOBILE DEVICE

710 GENERATE A DEVICE-INDEPENDENT CANVAS BASED ON THE LAYOUT RELATIONSHIP, DEVICE ATTRIBUTES, AND PRINT ATTRIBUTES

712 PROVIDE THE DEVICE-INDEPENDENT CANVAS DATA TO THE MOBILE DEVICE TO BE RENDERED INTO A DEVICE-SPECIFIC PRESENTATION

*FIG. 7*

802 REQUEST A LIST OF PRINT SERVICES AVAILABLE ON A NETWORK

804 SEND A DOCUMENT FROM A MOBILE DEVICE TO A HTTP SERVER

806 RENDER A USER INTERFACE INTO A DEVICE-SPECIFIC LAYOUT FROM A DEVICE-INDEPENDENT CANVAS IN ACCORDANCE WITH A NESTING LAYOUT RELATIONSHIP BASED ON A SCREEN SIZE OF THE MOBILE DEVICE, PRINTER SETTING INFORMATION, A NUMBER OF PAGES OF THE DOCUMENT, AND DIMENSIONS OF THE PAGES

*FIG. 8*

902 REQUEST A LIST OF PRINT SERVICES AVAILABLE ON A NETWORK

904 RENDER A USER INTERFACE TO OFFER PRINTERS AVAILABLE ON THE NETWORK AND SETTINGS AVAILABLE TO THE PRINTERS

906 SEND A DOCUMENT FROM A MOBILE DEVICE TO A HTTP SERVER AND A REQUEST TO ANALYZE THE DOCUMENT

908 MAKE VISUAL ADJUSTMENTS TO THE USER INTERFACE INCLUDING THE CANVAS BASED ON USER INPUT FROM A TOUCHSCREEN LAYER OF THE MOBILE DEVICE

910 SEND A RIP REQUEST TO THE HTTP SERVER TO PROCESS THE DOCUMENT

912 RENDER A USER INTERFACE INTO A DEVICE-SPECIFIC LAYOUT FROM A DEVICE-INDEPENDENT CANVAS IN ACCORDANCE WITH A NESTING LAYOUT RELATIONSHIP BASED ON A SCREEN SIZE OF THE MOBILE DEVICE, PRINTER SETTING INFORMATION, A NUMBER OF PAGES OF THE DOCUMENT, AND DIMENSIONS OF THE PAGES

914 SEND A PRINT JOB REQUEST INCLUDING NESTING PREFERNCE INFORMAITION TO THE HTTP SERVER TO ROUTE THE PRINT JOB TO THE PRINT APPARATUS THAT OFFERS THE PRINT SERVICE.

*FIG. 9*

DEVICE-INDEPENDENT CANVAS

BACKGROUND

Images are processed for use with computing machines, such as a print apparatus. A print apparatus, for example, may use control data based on processed image data to reproduce a physical representation of an image by operating a print fluid ejection system according to the control data image may be processed in a print apparatus pipeline or processed offline on separate compute device, such as a print server.

DETAILED DESCRIPTION

In the following description and figures, some example implementations of apparatus, systems, and/or methods related to providing a print service to a mobile device are described. In examples described herein, a "print apparatus" may be a device to print content on a physical medium (e.g., paper, textiles, a layer of powder-based build material, etc.) with a print material (e.g., ink or toner). For example, the print apparatus may be a wide-format print apparatus that prints latex-based print fluid on a print medium, such as a print medium that is size A2 or larger. In some examples, the physical medium printed on may be a web roll or a pre-cut sheet. In the case of printing on a layer of powder-based build material, the print apparatus may utilize the deposition of print materials in a layer-wise additive manufacturing process. A print apparatus may utilize suitable print consumables, such as ink, toner, fluids or powders, or other raw materials for printing. In some examples, a print apparatus may be a three-dimensional (3D) print apparatus. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

Various examples described below relate to providing a print service to a mobile device, Software libraries used by mobile devices to analyze and view documents may be different than the libraries used by printers when printing a document. The present disclosure describes that, instead of relying on the mobile device to be compatible with a printer library, a print server may be used to perform print services using libraries on the print server and generate a device-independent canvas renderable by the mobile device. In this manner, uniformity is more likely across devices and printer combinations.

Figure 1:
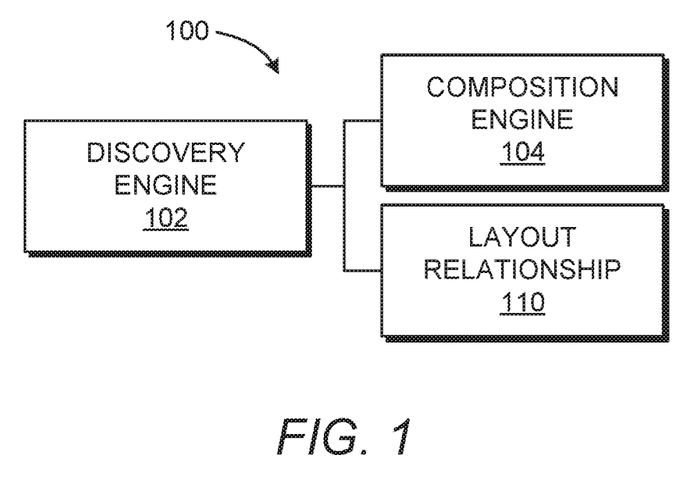
FIGS. 1 and 2 are block diagrams depicting example systems for providing a print service to a mobile device.
Figure 2:
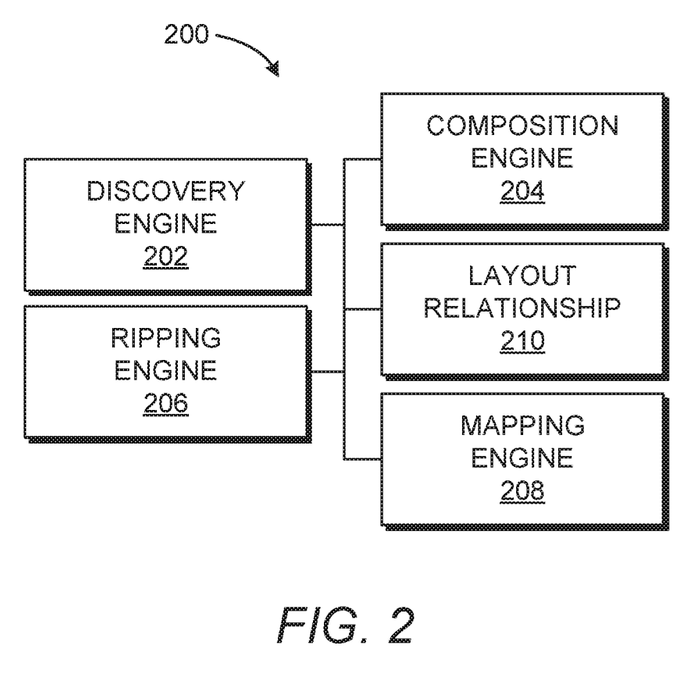

FIGS. 1 and 2 are block diagrams depicting example systems 100 and 200 for providing a print service to a mobile device. Referring to FIG. 1, the example system 100 of FIG. 1 generally includes a discovery engine 102 and a composition engine 104. In general, the composition engine 104 may generate a device-independent canvas for rendering on a mobile device based on the printer service selected from available printers on the network discovered by the discovery engine 102.

The discovery engine 102 represents any circuitry or combination of circuitry and executable instructions to discover printers and/or services on a network. For example, the discovery engine 102 may be a combination of circuitry and executable instructions, that when executed, cause the circuitry to discover printers on a network, identify print services available to the printers on the network including a raster image processing (RIP) service, and generate a first of printers and printer services available on the network.

The composition engine 104 represents any circuitry or combination of circuitry and executable instructions to generate a device-independent canvas including a preview image based on a selected printer and printer service. For example, the composition engine 104 may be a combination of circuitry and executable instructions that, when executed, cause the circuitry to generate a device-independent canvas including a preview image of a page of a print job derived from the RIP service corresponding to a print apparatus and print service combination. As used herein, a device-independent canvas is data representing renderable images in a layout. For example, the digital canvas may be located in a data structure with elements used to describe at what location images should be rendered. For example, the canvas may include a universal resource locator (URL) for an image (or set of images) and include data regarding a number of pages on the canvas, a page resolution for each of the number of pages, and a rotation of the pages (or rotation information for each page). For another example, the canvas may be created from a surface data set including a page data structure representation that includes a URL for a thumbnail corresponding to a preview image for each page of a print job, dimension information for each preview image, and rotation information for each preview image. The canvas may include representational elements, such as cutting lines or an image representing the media width and functional instructions, such as instructions representing constraints corresponding to the layout relationship 110. For example, the canvas may be scripting code to instruct a presentation layer on a device to render the canvas into a device-specific code via a device-independent platform using the device screen size, the media width, and print job data.

The composition engine 104 may determine the type of document to be previewed and cause an analyzer corresponding to the type of document identified to analyze the document. For example, the composition engine 104 may determine a document type of a print job, analyze a document of the print job according to the document type, and identify metadata corresponding to the document analysis. Metadata including the number of pages to show is provided to the client. Other metadata may include various types of thumbnails to show. A device-independent canvas may include metadata from source document analysis. The document analysis may be used to recommend a layout format.

The composition engine 104 uses the layout relationship 110 to produce a canvas that properly places the image in relationship to the user interface of a mobile device. The preview image is oriented on the device-independent canvas using a layout relationship that adjusts a layout format based printer setting information (e.g., information corresponding to the selected print apparatus and print service combination). The layout format corresponds to an amount of media space available when printing with the print apparatus and printer service combination. For example, the media space may be determined by the media width of a web roll of media coupled to the selected printer (or otherwise available to the selected printer) and the margin to be used when printing on the selected printer. Printer setting information includes data corresponding attributes of the printer and/or print job. Example printer setting information includes media width, a number pages of a print job, page dimensions of each of the number of pages, an orientation of each of the number of pages, a margin size, and other attributes that affect the amount of available space to be printed on. In some examples, the composition engine 104 identifies a layout format based on a media size, a number pages, page orientation, etc., and/or may use predetermined nesting options. As used herein, nesting refers to placement of images on a page, including a combination of the size, location, rotation, etc, of each image to be presented on the page.

In some examples, the composition engine 104 may generate data representing a user interface with user interface elements that are rendered based on device-specific attributes (e.g., based on the screen size of the mobile device) and other user interface elements, such as the device-independent canvas, based on printer information. In this manner, the user interface data representation including the device-independent canvas data may be sent with instructions to render a user interface with the canvas based on printer setting information and a device screen size to allow for the canvas preview to be substantially uniform across devices while other parts of the user interface may be more accommodating of the screen size. For example, the layout relationship may be embedded into the canvas data to constrain the visual presentation of a number of pages of the print job on the canvas responsive to printer setting information, such as media width, and constrain the non-canvas area of the user interface responsive to the device screen size of a device upon which the canvas is rendered.

The composition engine 104 may generate the canvas using an image library using mapping data and interactive data relationships that are interpretable by a presentation layer of a device via a device-independent platform. Mapping data and interactive data relationships may allow for a user to adjust a preview image using image modification operations, such as zoom, crop, and rotate. In one example, the image preview generation (e.g., ripping) and image mapping functionality may be offered as part of the composition engine 104. FIG. 2 represents another example of engines to implement a system 200 for providing a print service to a mobile device.

Referring to FIG. 2, the system 200 may include a discovery engine 202 and a composition engine 204 as well as a ripping engine 206 and a mapping engine 208. The ripping engine 206 represents any circuitry or combination of circuitry and executable instructions to generate the preview image according to the selected print service. For example, the ripping engine 206 may be a combination of circuitry and executable instructions that, when executed, cause the circuitry to perform raster image processing on image data, use the result to create a preview image, and provide a link to the preview image in a canvas.

The mapping engine 208 represents any circuitry or combination of circuitry and executable instructions to enable making adjustments to the canvas based on user input interaction instructions. For example, the mapping engine 208 may be a combination of circuitry and executable instructions that, when executed, cause the circuitry to calculate dimensions and location of a view of the preview image based on user input, provide coordinates corresponding to the calculated dimensions and location of the view, and cause the layout format to adjust according to the layout relationships as affected by changes to the canvas based on the user input. The mapping engine 204 may calculate the view of a particular resolution and provide coordinates of the view to be rendered on a mobile device based on mapping information embedded in the canvas. For example, the information of the preview location, resolution, etc, is tracked to cover a subset of the image data and may change based on user input. The mapping engine 208 may interact with the composition engine 204, For example, the composition engine 204 may generate layers of the preview image to enable mapping functionality determined by the mapping engine 208 to be usable with a rendered canvas.

Figure 3:
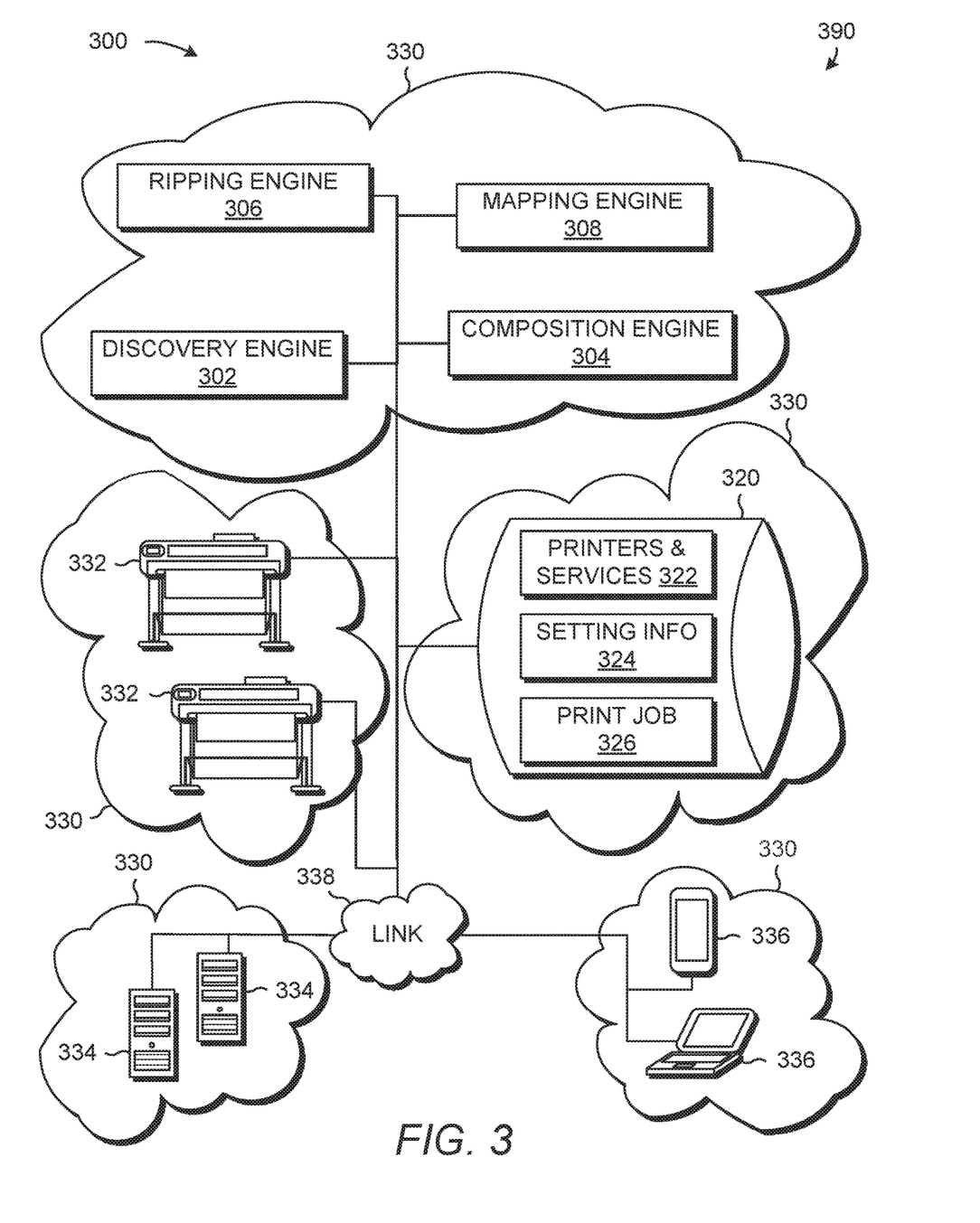
FIG. 3 depicts an example environment in which various systems for providing a print service to a mobile device may be implemented.

FIG. 3 depicts an example environment in which various systems for providing a print service to a mobile device may be implemented. The example environment 390 is shown to include an example system 300 for providing a print service to a mobile device 336. The system 300 (described herein with respect to FIGS. 1 and 2) may represent generally any circuitry or combination of circuitry and executable instructions to offer services available by printers 332 on a network 330 through a device-independent canvas renderable by a mobile device 336. The system 300 may include a discovery engine 302, a composition engine 304, a ripping engine 306, and a mapping engine 308 that are the same as the discovery engine 202, the composition engine 204, the ripping engine 206, and the mapping engine 208 of FIG. 2, respectively, and the associated descriptions are not repeated for brevity. As shown in FIG. 3, the engines 302, 304, 306, and 308 may be integrated into a compute device, such as a server device 334. The engines 302, 304, 306, and 308 may be integrated via circuitry or as installed instructions into a memory resource of the compute device.

The example environment 390 may include compute devices, such as print apparatus 332, service devices 334, and user devices 336. The service devices 334 represent generally any compute devices to respond to a network request received from a user device 336, whether virtual or real. For example, the service device 334 may operate a combination of circuitry and executable instructions to provide a network packet in response to a request for a page or functionality of an application. Example service devices include web servers and print servers. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application.

The compute devices may be located on separate networks 330 or part of the same network 330. The example environment 390 may include any appropriate number of networks 330 and any number of the networks 330 may include a cloud compute environment. A cloud compute environment may include a virtual shared pool of compute resources. For example, networks 330 may be distributed networks comprising virtual computing resources. Any appropriate combination of the system 300 and compute devices may be a virtual instance of a resource of a virtual shared pool of resources. The engines and/or modules of the system 300 herein may reside and/or execute "on the cloud" (e.g., reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 may include, at least in part, intranet, the Internet, or a combination of both. The link 338 may also include intermediate proxies, routers, switches, load balancers, and the like.

The data store 320 may contain information utilized by the engines 302, 304, 306, and 308. The discovery engine 302 may store and maintain a list of printers and services 322 on a data store 320 as well as printer setting information 324. The print job data 326 may also be stored on the data store 320.

Referring to FIGS. 1-3, the engines 102 and 104 of FIG. 1 and/or the engines 202, 204, 206, and 208, of FIG. 2 may be distributed across devices 332, 334, 336, or a combination thereof. The engine may complete or assist completion of operations performed in describing another engine. For example, the composition engine 304 of FIG. 3 may request, complete, or perform the methods or operations described with the composition engine 204 of FIG. 2 as well as the discovery engine 202, the composition engine 204, the ripping engine 206, and the mapping engine 208 of FIG. 2. Thus, although the various engines and modules are shown as separate engines in FIGS. 1-3, in other implementations, the functionality of multiple engines and/or modules may be implemented as a single engine and/or module or divided in a variety of engines and/or modules. In some example, the engines of the system 300 may perform example methods described in connection with FIGS. 1-3.

Figure 4:
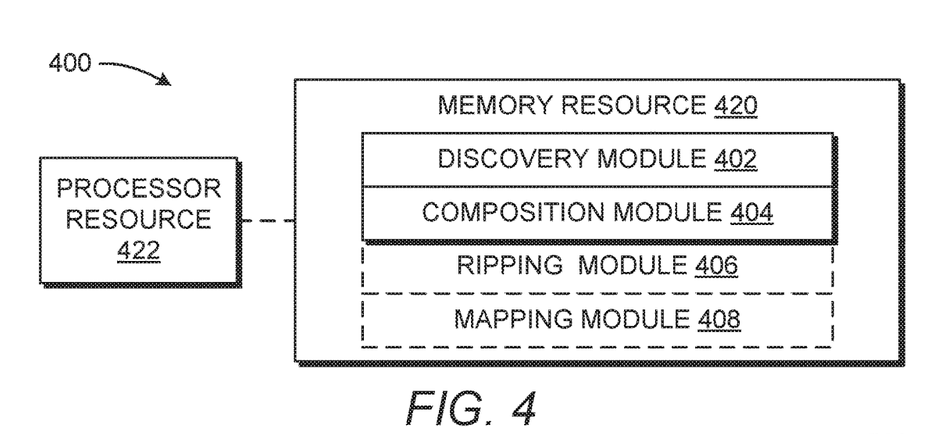
FIG. 4 is a block diagram depicting an example system for providing a print service to a mobile device.

FIG. 4 is a block diagram depicting an example system for providing a print service to a mobile device. FIG. 4 depicts the example system 400 may comprise a memory resource 420 operatively coupled to a processor resource 422.

Referring to FIG. 4, the memory resource 420 may contain a set of instructions that are executable by the processor resource 422. The set of instructions are operable to cause the processor resource 422 to perform operations of the system 400 when the set of instructions are executed by the processor resource 422. The set of instructions stored on the memory resource 420 may be represented as a discovery module 402 and a composition module 404 (and, in some examples, a ripping module 406 and a mapping module 408). The discovery module 402, the composition module 404, the ripping module 406, and the mapping module 408 represent program instructions that when executed function as the discovery engine 202, the composition engine 204, the ripping engine 206 and the mapping engine 208 of FIG. 2, respectively. The processor resource 422 may carry out a set of instructions to execute the modules 402, 404, 406, 408, and/or any other appropriate operations among and/or associated with the modules of the system 400. For example, the processor resource 422 may carry out a set of instructions to identify services offered by a print apparatus on a network accessible by a mobile device, determine that a service includes raster image processing to be performed on a print server, process image data of a print job to generate a preview according to a size attribute of the mobile device in response to selection of the service that includes the raster image processing on the print server, and generate a device-independent canvas including the preview based on a layout relationship that, when rendered by a presentation layer of the mobile device, adjusts according to a screen size of the mobile device, a media width, a margin size, and a number of pages of the print job. For another example, the processor resource 422 may carry out a set of instructions to provide a URL to a print server where the mobile device can send the print job data to be processed to generate the device-independent canvas and provide the device-independent canvas data to the mobile device to be rendered into a device-specific presentation via a virtual machine of a device independent platform. For yet another example, the processor resource 422 may carry out a set of instructions to identify a job submittal request to an embedded web server corresponding to a print apparatus, redirect the job submittal request to the print server to perform raster image processing on the printer server, and provide a device-independent canvas to the source of the job submittal request with an image preview resulting from the raster image processing on the print server to be rendered on the mobile device within the media space available in accordance with the printer setting information corresponding to the print apparatus. For yet another example, the processor resource 422 may carry out a set of instructions to determine a page description language (PDL) supported by a print apparatus, rip the print job data using a raster image processing engine compatible with the PDL, and provide a preview of the ripped print job data in canvas constrained by a layout relationship dependent on printer setting information and the screen size of the mobile device.

Figure 5:
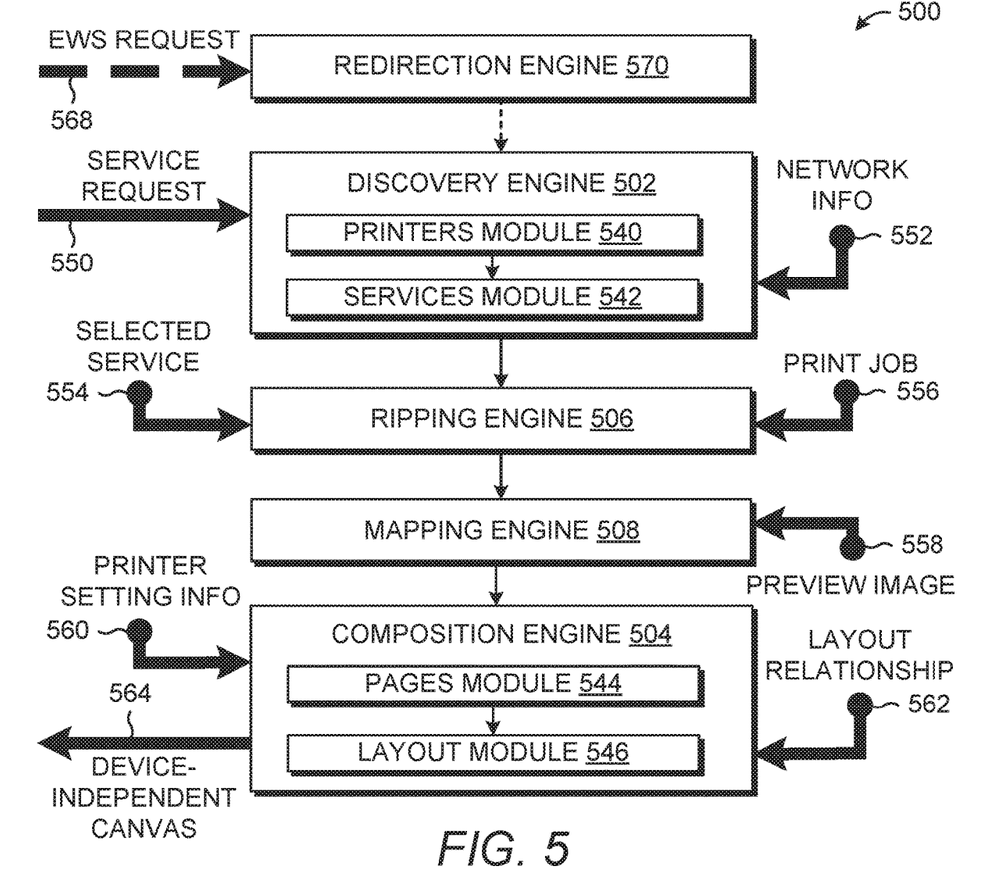
FIG. 5 depicts example components used to implement an example system for providing a print service to a mobile device.

Although these particular modules and various other modules are illustrated and discussed in relation to FIG. 4 and other example implementations, other combinations or sub-combinations of modules may be included within other implementations. Said differently, although the modules illustrated in FIG. 4 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 5 depicts yet another example of how functionality may be organized into engines and modules.

A processor resource is any appropriate circuitry capable of processing (e.g., computing) instructions, such as one or multiple processing elements capable of retrieving instructions from a memory resource and executing those instructions. For example, the processor resource 422 may be a central processing unit (CPU) that enables providing a print service via a device-independent canvas by fetching, decoding, and executing modules 402, 404, 406, and 408. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system 400. The medium is any non-transitory medium or combination of non-transitory media able to electronically store data, such as modules of the system 400 and/or data used by the system 400. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the system 400 of FIG. 4. A memory resource may be integrated in the same device as a processor resource or it may be separate but accessible to that device and the processor resource. A memory resource may be distributed across devices.

In the discussion herein, the engines of FIGS. 1-3 have been described as circuitry or a combination of circuitry and executable instructions. Such components may be implemented in a number of fashions. Looking at FIG. 4, the executable instructions may be processor-executable instructions, such as program instructions, stored on the memory resource 420, which is a tangible, non-transitory computer-readable storage medium, and the circuitry may be electronic circuitry, such as processor resource 422, for executing those instructions. The instructions residing on a memory resource may comprise any set of instructions to be executed directly (such as machine code) or indirectly (such as a script) by a processor resource.

In some examples, the system 400 may include the executable instructions may be part of an installation package that when installed may be executed by a processor resource to perform operations of the system 400, such as methods described with regards to FIGS. 6-9. In that example, a memory resource may be a portable medium such as a compact disc, a digital video disc, a flash drive, or memory maintained by a computer device, such as a service device 334 of FIG. 3, from which the installation package may be downloaded and installed. In another example, the executable instructions may be part of an application or applications already installed. A memory resource may be a non-volatile memory resource such as read only memory (ROM), a volatile memory resource such as random access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid state drive (SSD), or an optical drive.

In some examples, functionalities described herein in relation to any of FIGS. 1-4 may be provided in combination with functionalities described herein in relation to any of FIGS. 5-9.

FIG. 5 depicts example components used to implement an example system 500 for providing a print service to a mobile device, Referring to FIG. 5, the example components of FIG. 5 generally include a discovery engine 502, a composition engine 504, a ripping engine 506, and a mapping engine 508. The system 500 may include a redirection engine 570 which represents circuitry or a combination of circuitry and executable instructions to redirect a service request sent directly to a printer, such as an embedded web server (EWS) request 568, to the discovery engine 502 so that the print service request replies go through the system 500 to improve uniformity of delivery to users accessing print services across various print apparatus of the network. The example engines and modules of FIG. 5 may be implemented on a compute device, such as a print server.

A service request 550 is received by the discovery engine 502, The discovery engine 502 includes program includes program instructions, such as a printers module 540 and a services module 542, to assist in generating a list of printers and print services available on a network. The printers module 440 represents program instructions that when executed cause a processor resource to broadcast a request for print apparatus connected to the network (based on network information 552) and compile a list of printers from the replies to the broadcast. The services module 542 represents program instructions that when executed cause a processor resource to request a list of available services from each print apparatus discovered by the printers module 540 and compile a list of print services from the replies to request for available services. Execution of the services module causes a PDL for each discovered printer to be identified. The discovery engine 502 causes a list of printers and print services corresponding to the printers to be provided in response to the service request 550.

A service is selected by a user and the selected service 554 is sent to a ripping engine 506 based on the PDL of the selected service (e.g., and corresponding selected printer). The ripping engine 506 selects a raster image process that is compatible with the PDL and then performs raster image processing on the print job data 556 to generate a preview image 558 of the print job. The preview image 558 is to be part of the device-independent canvas 564 and is generated from a raster image processing engine corresponding to the version, type, and/or functionally of the selected print apparatus and print service combination. The raster image processing engine used to generate the preview image 558 is to be the same raster image processing engine used to process the image for printing the image using the selected print apparatus.

The preview image 558 is received by a mapping engine 508, Layers of the preview image 558 are generated corresponding to the mapping functionality available to place into the device-independent canvas. For example, a layer for each zoom level capable by the canvas may be generated based on the preview image 558.

The composition engine 504 may generate a device-independent canvas 564 using image information (e.g. preview image 558), mapping information (e.g., layer information), printer setting information 560 (e.g., media width) and a layout information (e.g., layout relationship 562). The composition engine 504 program instructions, such as a pages module 544 and a layout module 546, to assist in generation of the device-independent canvas 564. The pages module 544 represents program instructions that when executed cause a processor resource to determine a number of pages of the print job and an orientation of the pages of the print job.

The layout module 546 represents program instructions that when executed cause a processor resource to generate data (e.g., a device-independent canvas 564) representing pages of the print job 556 oriented on a canvas based on a layout relationship that adjusts according to a mobile device, a printer, and a print job. For example, the layout format may adjust based on constraints defined by a screen size of the mobile device, a media width, a margin size, and a number of pages of the print job. The device-independent canvas 564 is able to adjust according to the screen size of the mobile device when it is rendered by a presentation layer of the mobile device while the device-independent canvas maintains a layout format based on the media width, margin size, number of pages of the print job, etc. An executed layout module 546 may adjust the images as placed on pages of the canvas based on a nesting relationship. A nesting relationship may define a location, orientation, dimension, zoom, and other attributes of a number of images on a page. For example, a first image may take up ⅔ of a page and two smaller pictures may take up the remaining third and be in a different orientation such landscapes or portrait orientation. A representation of the placement of images programmed into the device-independent canvas 564 to maintain the layout relationship 562 when the device-independent canvas 564 is rendered on presentation layer of a mobile device.

Figure 6:
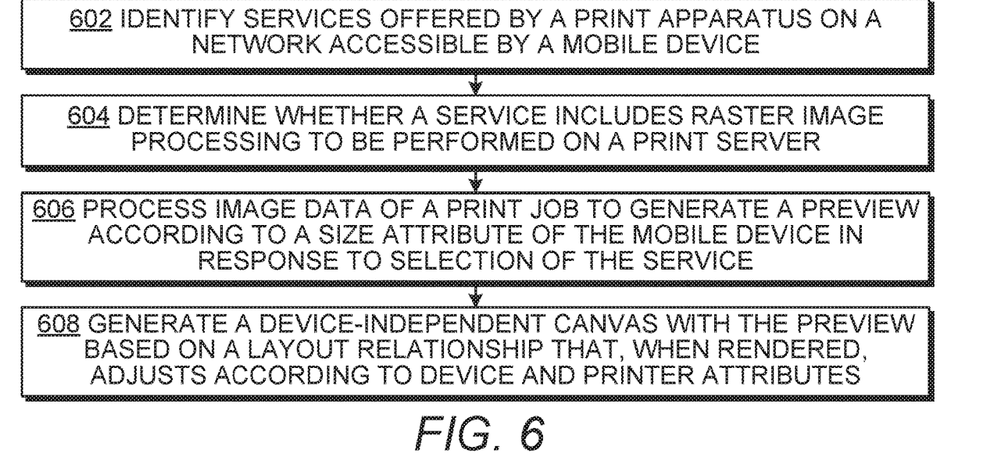
FIGS. 6-9 are flow diagrams depicting example methods for providing a print service to a mobile device.

FIGS. 6-9 are flow diagrams depicting example methods for providing a print service to a mobile device. Referring to FIG. 6, example methods for providing a print service to a mobile device may generally comprise identifying print services on a network, determining whether a service includes raster image processing, processing image data, and generating a device-independent canvas. The methods discussed in FIGS. 6-9 are performable by various system discussed herein, such as systems 100, 200, 300, 400, and 500 pictures in FIGS. 1-5 respectively.

At block 602, services offered by a print apparatus on a network accessible by a mobile device are identified. At block 604, the system determines whether a service includes a raster image processing operation to be performed on a print server. In response to selection of a service that includes a raster image processing operation, image data of a print job is processed by a corresponding raster image processing engine to generate a preview according to a size attribute of a mobile device at block 606. At block 608, a device-independent canvas with the preview is generated based on a layout relationship that, when rendered, adjusts according to device attributes (e.g., the mobile device screen size) and printer attributes (e.g., printer setting information, such as media width).

Figure 7:
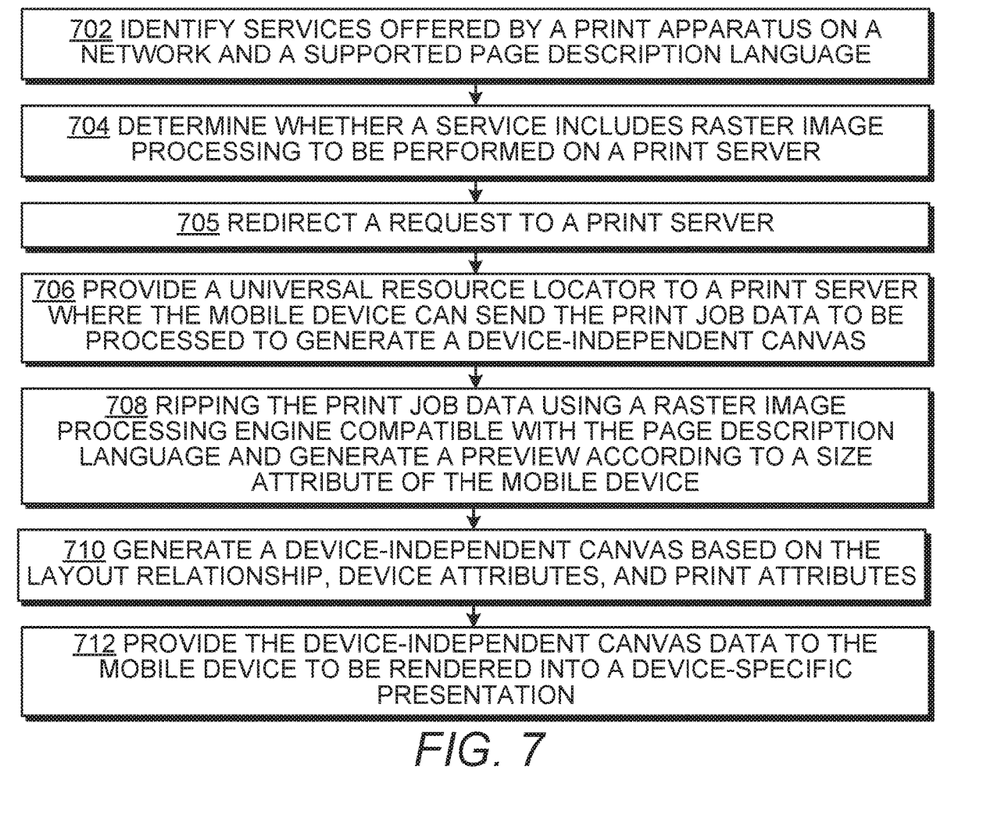

FIG. 7 includes blocks similar to blocks of FIG. 6 and provides additional blocks and details. In particular, FIG. 7 depicts additional blocks and details generally regarding providing a URL to a print server, ripping a print job, providing a preview of the layout, and providing the device-independent canvas data to a mobile device. Blocks 702, 704, 708, and 712 are similar to blocks 602, 604, 606, and 608 of FIG. 6 and, for brevity, their respective descriptions are not repeated in their entirety.

At block 702, a supported PDL is identified with the services offered by a print apparatus on a network and a raster image processing service is determined to be offered by a print server compatible with the print apparatus at block 704.

A service request to access a printer service directly from a printer may be identified and redirect to a print server for a response at block 705, A URL to the print server is provided to the mobile device to send print job data to be processed to generate a canvas at block 706. At block 708, the print job data is ripped used in a raster image processing engine compatible with the PDL of the selected print apparatus and a preview image is generated according to a size attribute of the mobile device.

At block 710, a device-independent canvas is generated based on the layout relationship, device attributes, and print attributes (e.g., using layout information, device information, and printer setting information). The device-independent canvas data is provided to the mobile device to be rendered into a device-specific presentation that is in a layout format that is visually constrained within the limits of the layout relationship based on the screen size of the mobile device, the media width of a media roll available to the print apparatus to print the image preview, and any other appropriate attributes that may affect how the available media space is displayed on a mobile device. At block 712, a preview of the layout is provided to the mobile device based on analysis of the document and the result of the rip of the image data at block 708 as placed according to the device-independent canvas generated at block 710. The mobile device is provided a device-independent canvas data in a format that is renderable by the mobile device to generate a device-specific presentation of a user interface that is constrained within the limits of the layout relationship between the available media space of the print apparatus and the screen size of the mobile device. For example, mapping and relative nesting functionality may be embedded into the device-independent canvas with layout information including a preview image and a device-independent rendering platform on the mobile device may utilize the data render, via a presentation layer of the mobile device, the data to present a canvas on the screen of the mobile device that represents the preview image in a layout within a media width of the print apparatus.

Figure 8:
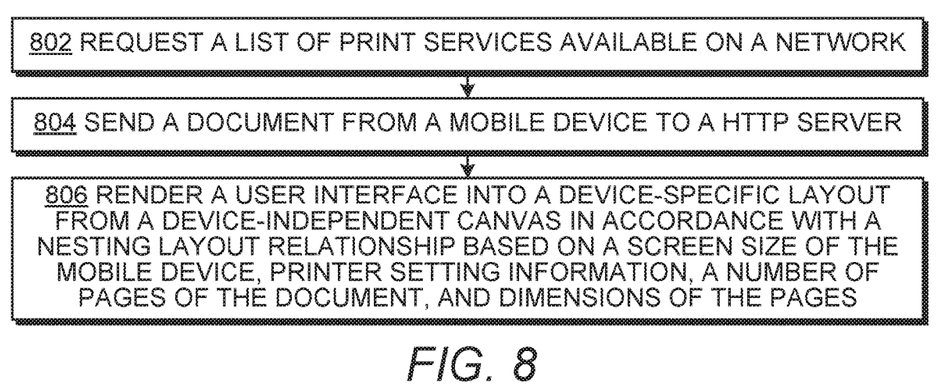

Referring to FIG. 8, example methods for providing a print service to a mobile device may generally comprise requesting a list of print services available on a network, sending a document to a server, and rendering a user interface. The methods depicted in FIGS. 8 and 9 are performable by circuitry or a combination of circuitry and executable instructions located on a device coupled to a network, such as a mobile device.

At block 802, a list of print services available on a network is requested. For example, a mobile device may broadcast a request on a network and receive a reply regarding the print services available on the network. At block 804, a document is sent from the mobile device to a hypertext transfer protocol (HTTP) server corresponding to a print service available on the network (such as a print server discussed herein). The HTTP server may be accessible by a URL provided in response to the request for print services of block 802.

At block 806, a presentation layer of the mobile device renders a user interface including a preview image of a number of pages of the document as processed by a selected image processing service (e.g.; a RIP service) of the list of print services. The user interface is rendered into a device-specific layout from a device-independent canvas. The device-specific layout may be rendered in accordance with a nesting layout relationship based on device settings and printer settings including a screen size of the mobile device, printer setting information corresponding to a media width and a margin size, the number of pages of the document to be printed, and dimension information (e.g., the location, size, height, width, resolution, orientation rotation, etc.) of the pages of the document to be printed relative the media width and margin size.

Figure 9:
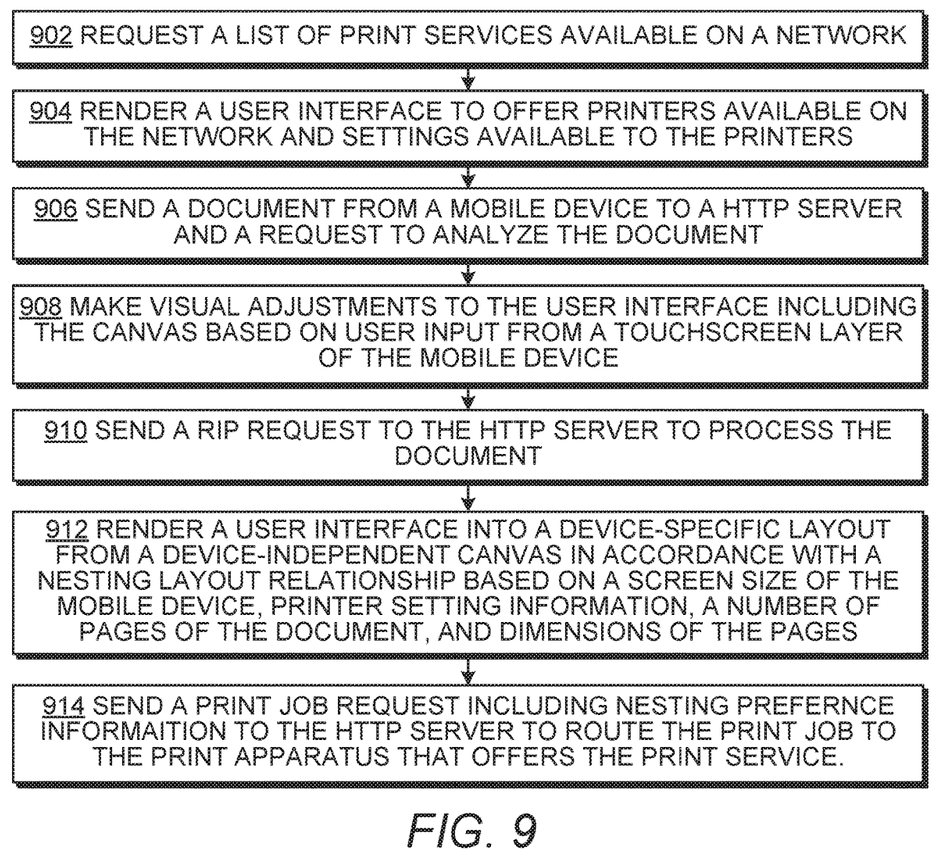

FIG. 9 includes blocks similar to blocks of FIG. 8 and provides additional blocks and details. In particular, FIG. 9 depicts additional blocks and details generally regarding rendering a user interface to offer printers and settings, sending a rip request, sending a document analysis request, making visual adjustments, changing a setting based on user input, and sending a print job request to a print apparatus. Blocks 802, 804, and 806 are similar to blocks 902, 906, and 912 of FIG. 9 and, for brevity, their respective descriptions are not repeated.

At block 904, a user interface is rendered to offer printers available on the network and setting available to the printers in response to the request for a list of print services available on a network at block 902. At block 906, a request is sent to the HTTP server to analyze the document sent from the mobile device to the HTTP server.

At block 908, visual adjustments are made to the user interface (including the canvas) based on user input from a touchscreen layer of the mobile device. For example, when a gesture is made to enlarge (e.g., zoom in on) an image on the rendered canvas, the user interface renders an appropriate zoom layer of the preview image on the canvas within the limits of the layout relationship (e.g., within the limits of the media width and screen size). The user input may also change a setting of the printer and/or the service to be offered on the print job in preparation to be printed. At block 910, a rip request is sent to the HTTP server from the mobile device to process the document according to a selected print service (e.g., PDL and compatible RIP engine type). The rip request may include printer setting information corresponding to a setting (such as a setting changed based on user input) to cause pages of the document to be processed according to a PDL corresponding to a print apparatus that offers the print services selected on the mobile device.

At block 912, a user interface is rendered into a device-specific layout from a device-independent canvas in accordance with a nesting relationship based on a screen size of the mobile device, printer setting information, a number of pages of the document, and dimensions of the pages of the document. At block 914, a print job request is sent to HTTP server to route the print job to the print apparatus that offers the print service. The print job request may include nesting preference information, such as a preferred nesting layout format that conforms to a layout relationship information as constrained on the canvas and user input that made visual changes to the canvas as rendered. In this manner, the HTTP server may act as a intermediary to the printer to improve visual accuracy between what is displayed on a mobile device and what is printed by a print apparatus.

Although the flow diagrams of FIGS. 5-9 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on," Thus, a feature that is described as based on some stimulus may be based only on the stimulus or a combination of stimuli including the stimulus. Furthermore, the use of the words "first," "second," or related terms in the claims are not used to limit the claim elements to an order or location, but are merely used to distinguish separate claim elements.

The present description has been shown and described with reference to the foregoing examples. It is understood, however, that other forms, details, and examples may be made without departing from the spirit and scope of the following claims.

What is claimed is:

1. A system comprising:
a discovery engine to:
   discover printers on a network;
   identify print services available to the printers on the network including a raster image processing (RIP) service;
   generate a list of printers and print services available;
a composition engine to:
   generate a device-independent canvas including a preview image of a page of a print job derived from the RIP service corresponding to a print apparatus and print service combination, the preview image oriented on the canvas using a layout relationship that adjusts a layout format based on printer setting information corresponding to the print apparatus and print service combination, the layout format corresponding to an amount of media space available when printing with the print apparatus and print service combination; and
   generate the canvas using image library using mapping data and interactive data relationships that are interpretable by a presentation layer of a mobile device via a device-independent platform, wherein the canvas includes scripting code to instruct the presentation layer to render the canvas into device-specific code via a device-independent platform using media width and print job data;
   wherein the canvas is created from a surface data set including a page with a thumbnail universal resource locator corresponding to the preview image and rotation information.

2. The system of claim 1, wherein:
the composition engine is further to generate a user interface with user interface elements including the device-independent canvas and a device-specific element, the device-specific element rendered based on the screen size of the mobile device;
the printer setting information includes a media width of a web roll available to the print apparatus; and
the layout relationship to constrain the visual presentation of a number of pages of the print job on the canvas and constrain a user interface element responsive to the device screen size of a device upon which the canvas is rendered and the media width.

3. The system of claim 2, wherein:
the composition engine is further to:
   analyze a document of the print job; and
   identify metadata corresponding to the document analysis; and
the printer setting information includes data corresponding to the document analysis including the number pages of a print job, page dimensions of each of the number of pages, an orientation of each of the number of pages, and a margin size.

4. The system of claim 1, wherein:
the canvas includes an image universal resource locator based on a number of pages, a page resolution for each of the number of pages, and a rotation.

5. The system of claim 1, further comprising:
a mapping engine to:
   calculate dimensions and location of a view of the preview image based on user input;
   provide coordinates corresponding to the calculated dimensions and location of the view; and
   cause the layout format to adjust according to the layout relationships as affected by changes to the canvas based on the user input.

6. The system of claim 5, further comprising:
a ripping engine to generate the preview image according to the selected print service, wherein the composition engine is to generate layers of the preview image to enable mapping functionality on a rendered canvas.

7. A non-transitory computer-readable storage medium comprising a set of instructions executable by a processor resource to:
identify services offered by a print apparatus on a network accessible by a mobile device;
determine that a service includes raster image processing to be performed on a print server;
provide a network location of the print server to the mobile device, the print server to process a print job received from the mobile device to generate a device-independent canvas;
in response to selection of the service that includes raster image processing on the print server, process image data of the print job to generate a preview according to a size attribute of the mobile device;
generate data renderable by the mobile device that represents user interface elements including the device-independent canvas with the preview, the user interface elements arranged based on a layout relationship that, when rendered by a presentation layer of the mobile device, adjusts according to a screen size of the mobile device, a media width, a margin size, and a number of pages of the print job; and
provide the device-independent canvas to the mobile device to be rendered into a device-specific presentation via a device independent platform.

8. The medium of claim 7, wherein the set of instructions is executable by the processor resource to:
provide the network location to the mobile device as a universal resource locator of the print server; and
wherein the device-independent canvas is to be rendered into the device-specific presentation via a virtual machine of the device independent platform, the device-independent canvas including metadata from a document analysis.

9. The medium of claim 8, wherein the set of instructions is executable by the processor resource to:
identify a job submittal request to an embedded web server corresponding to the print apparatus; and
redirect the job submittal request to the print server to perform raster image processing on the print server.

10. The medium of claim 9, wherein the set of instructions is executable by the processor resource to:

determine a page description language supported by the print apparatus;
rip the print job data using a raster image processing engine compatible with the page description language; and
provide a preview of the layout.

11. A method of providing a print service to a mobile device comprising:
requesting a list of print services available on a network;
sending a document from the mobile device to a hypertext transfer protocol (HTTP) server accessible by a universal resource locator provided in response to the request for print services;
receiving at the mobile device a device-independent canvas generated by a selected image processing service of the list of print services based on the document; and
rendering, via presentation layer of the mobile device, a user interface including a preview image of a number of pages of the document as processed by the selected image processing service of the list of print services, the user interface rendered into a device-specific layout from the device-independent canvas in accordance with a nesting layout relationship based on:
a screen size of the mobile device,
printer setting information corresponding to a media width and a margin size,
the number of pages of the document to be printed, and
dimensions of the pages of the document to be printed relative the media width and margin size.

12. The method of claim 11, comprising:
rendering a user interface to offer printers available on the network and settings available to the printers;
sending a request to the HTTP server to analyze the document;
making visual adjustments to the user interface including the canvas based on user input from a touchscreen layer of the mobile device; and
changing a setting based on the user input.

13. The method of claim 12, comprising:
sending a rip request, include the printer setting information corresponding to the changed setting, to the HTTP server to cause the pages of the document to be processed according to a page description language corresponding to a print apparatus that offers the print service; and
sending a print job request including nesting preference information to the HTTP server to route the print job to the print apparatus that offers the print service.

* * * * *